May 22, 1973 H. L. FRITZSCHE 3,734,771
METHOD FOR PRODUCING A PROTECTIVE COATING ON THE
SURFACE OF A MANUFACTURED ARTICLE
Original Filed Feb. 27, 1969 9 Sheets-Sheet 7
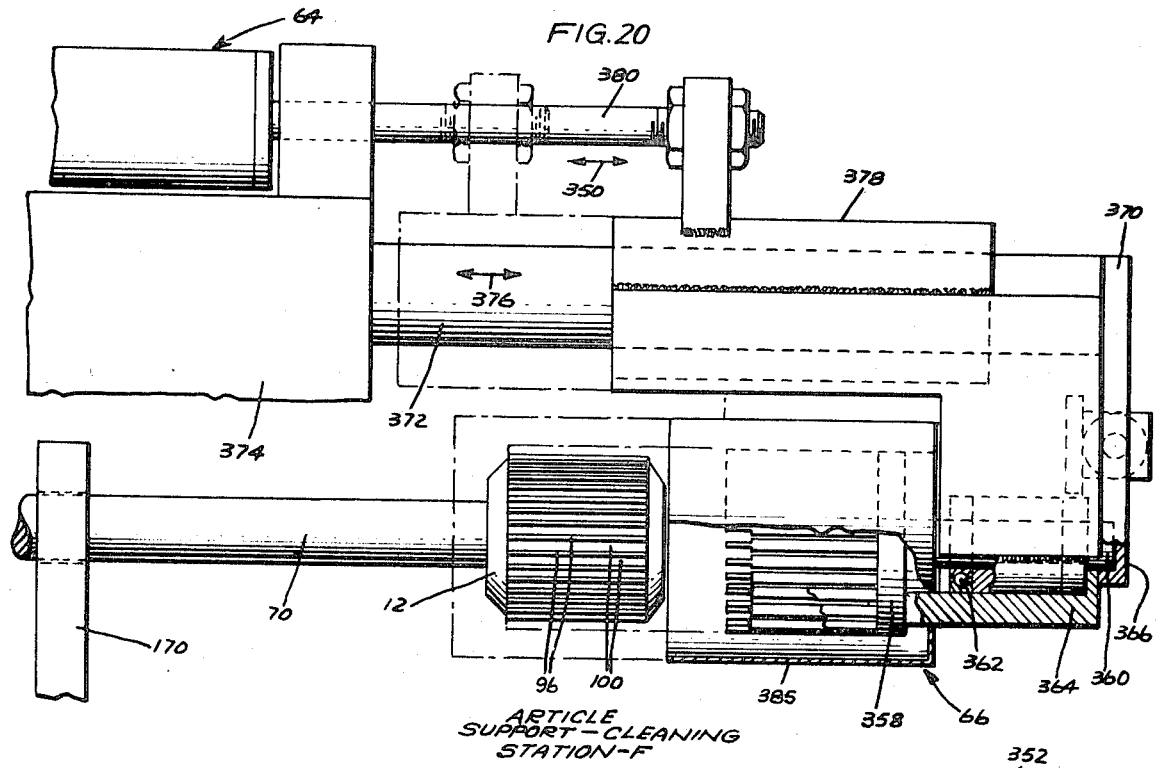
ARTICLE
SUPPORT–CLEANING
STATION–F
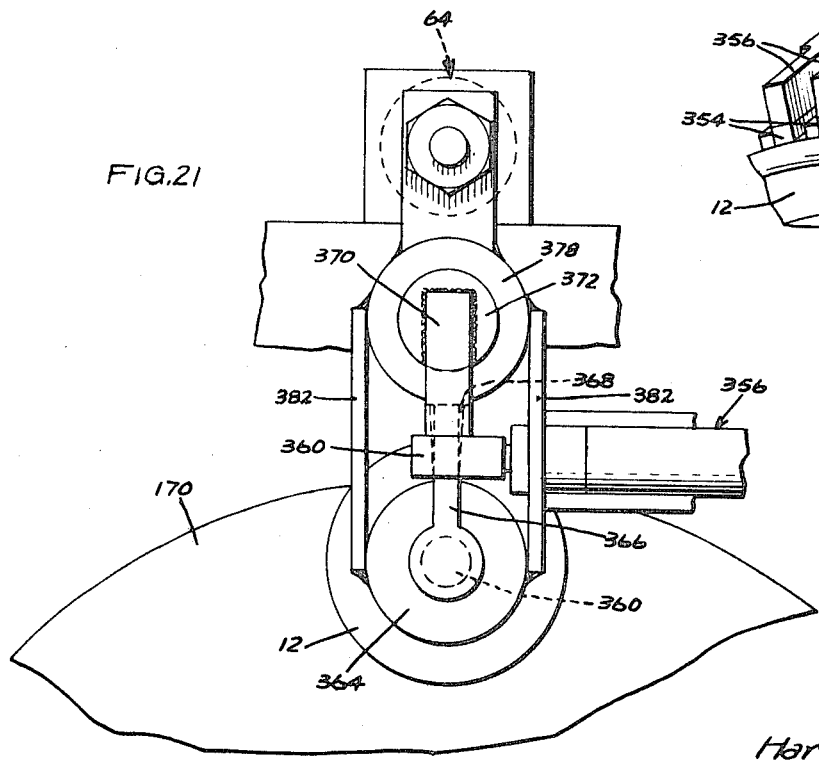
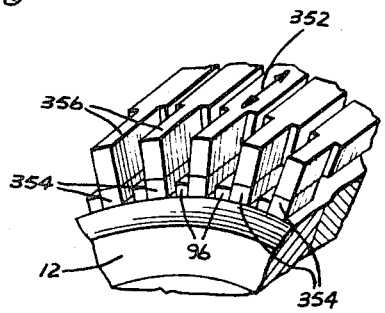
FIG.22
INVENTOR.
Harold L. Fritzsche,
BY Ralph E. Krisher Jr.
Attorney

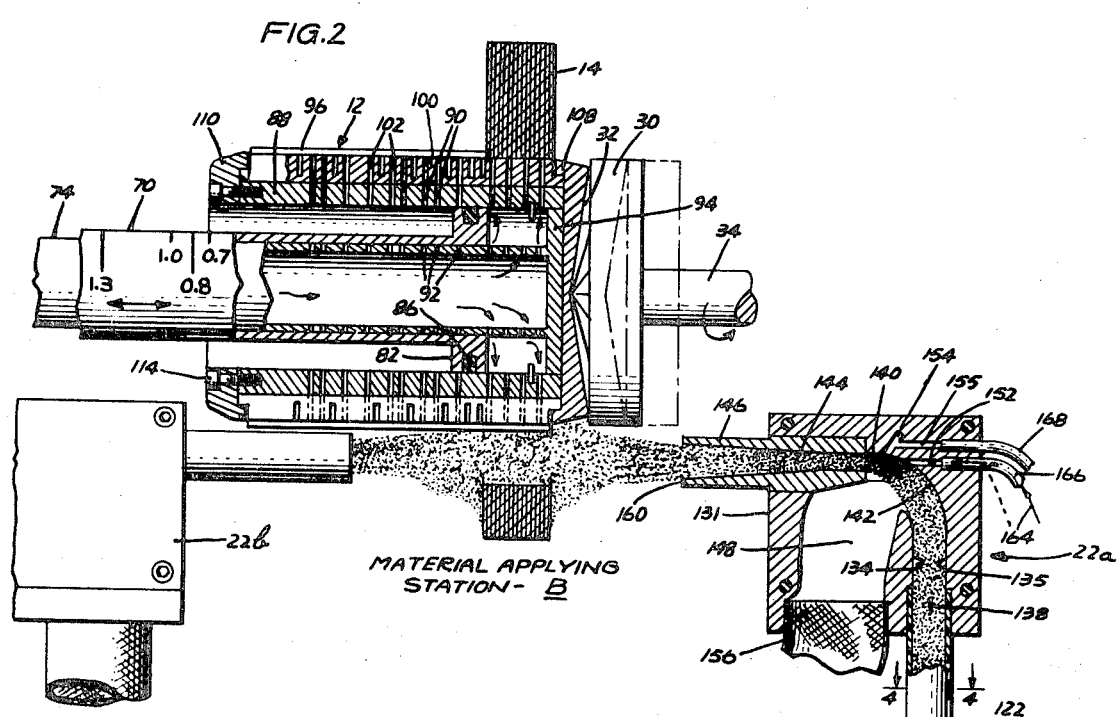
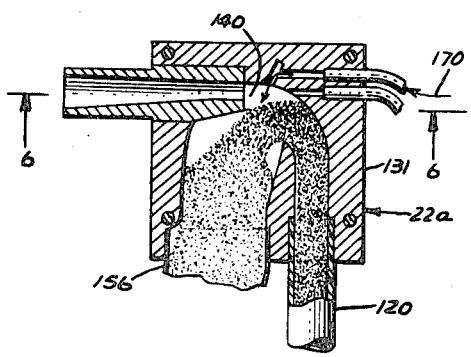
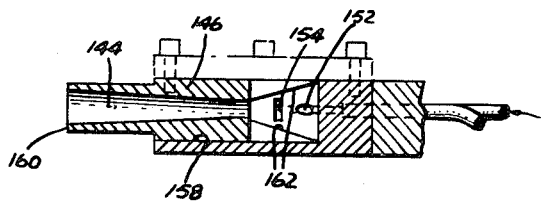
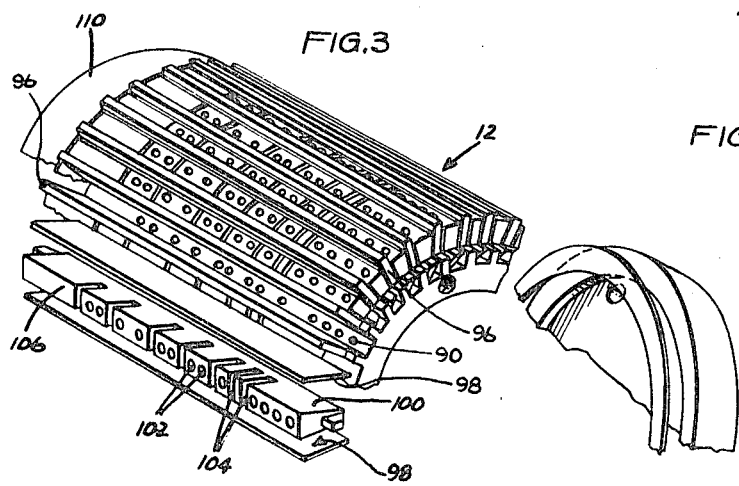
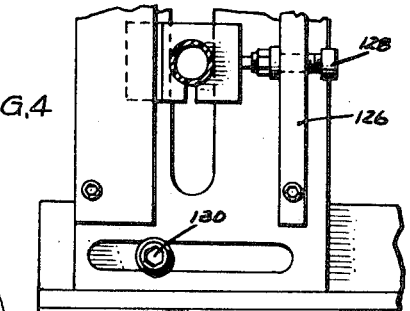

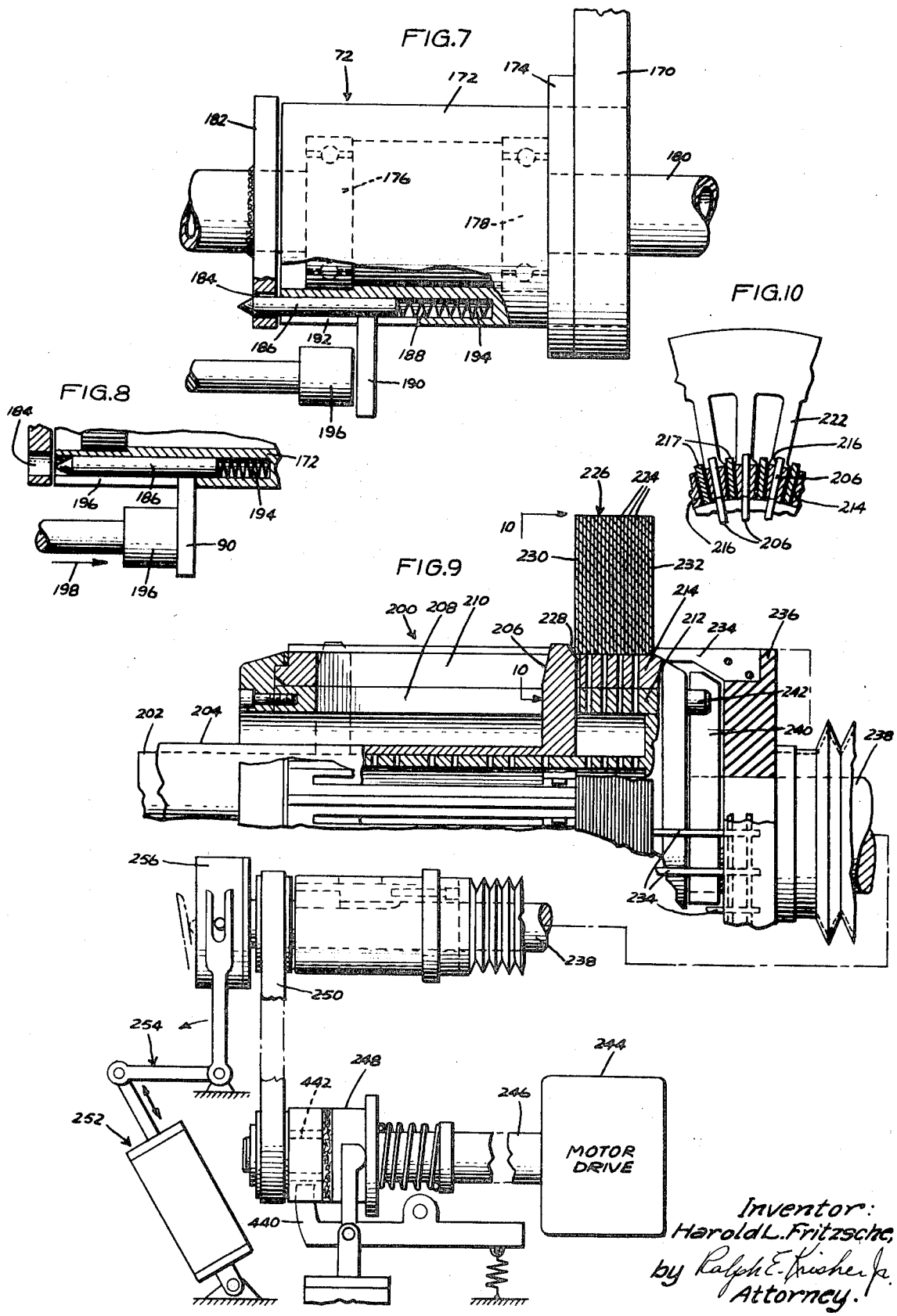

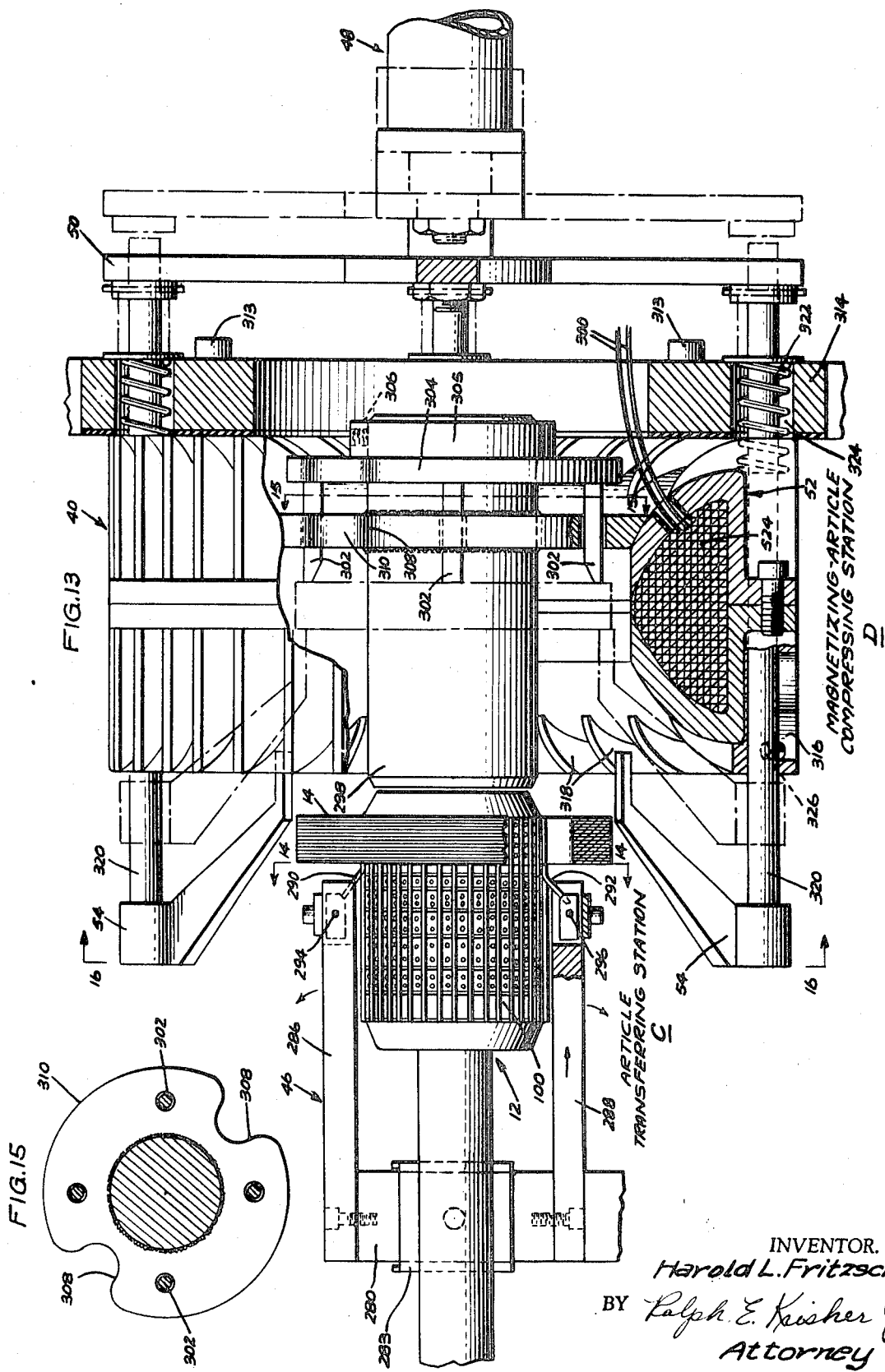

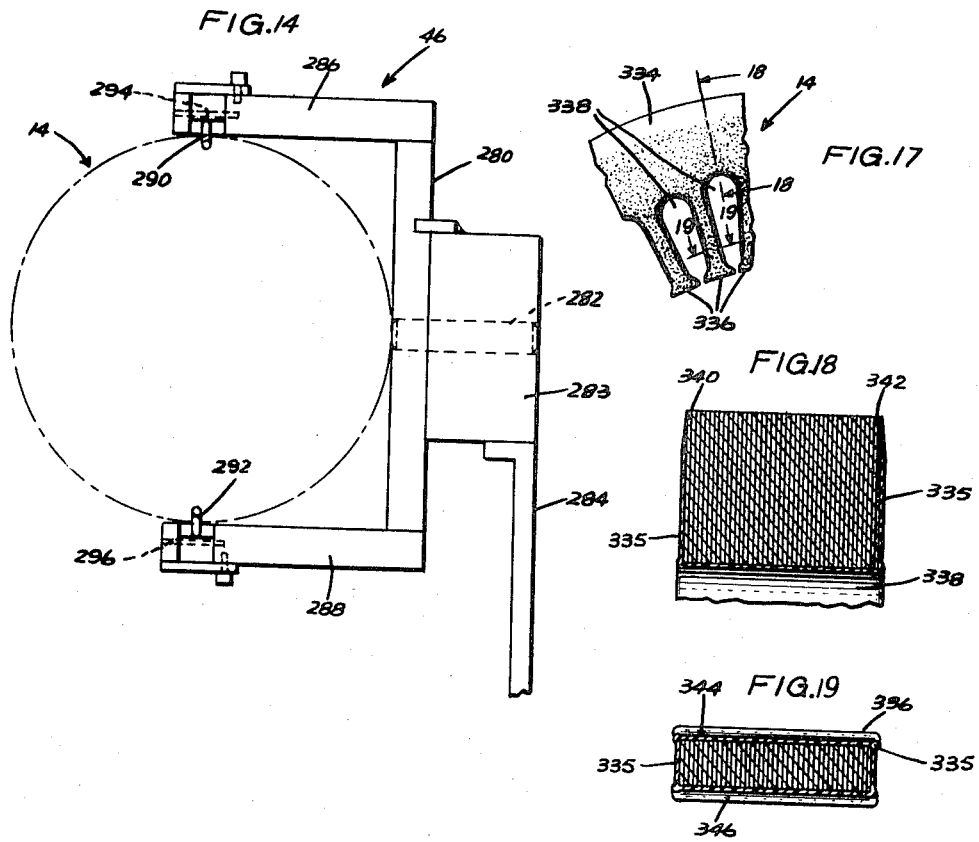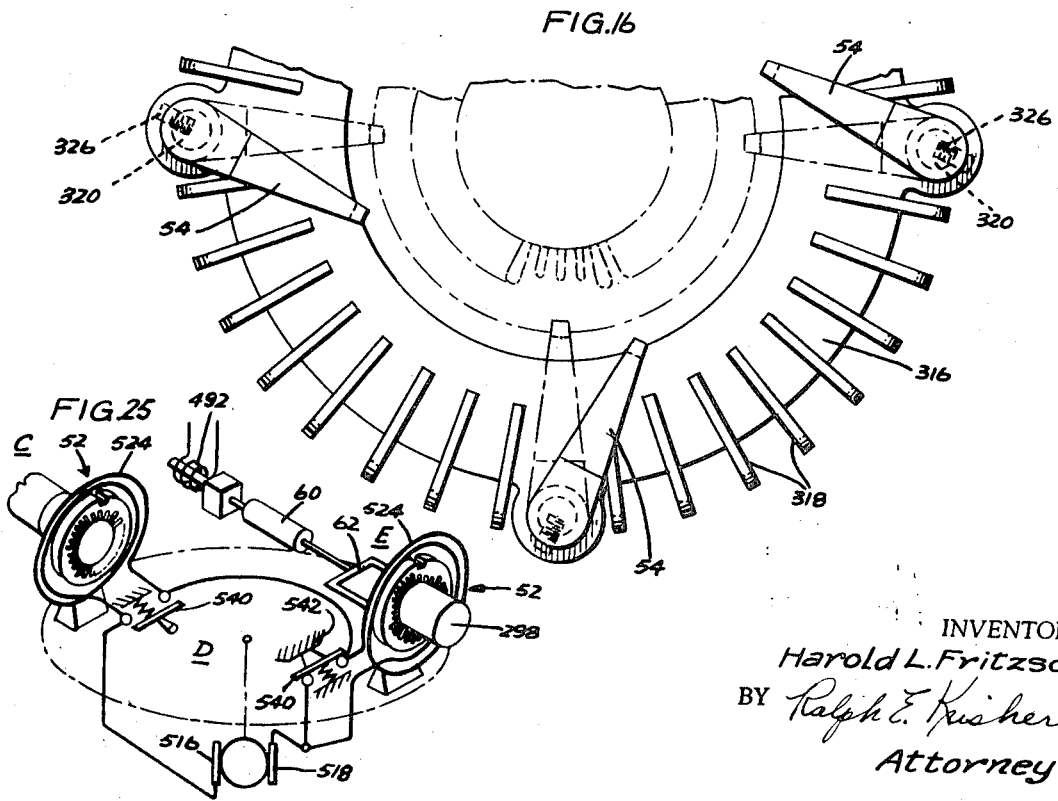

United States Patent Office 3,734,771
Patented May 22, 1973

3,734,771
METHOD FOR PRODUCING A PROTECTIVE COATING ON THE SURFACE OF A MANUFACTURED ARTICLE
Harold L. Fritzsche, Fort Wayne, Ind., assignor to General Electric Company
Original application Feb. 27, 1969, Ser. No. 803,036, now Patent No. 3,607,553, dated Sept. 21, 1971. Divided and this application July 1, 1970, Ser. No. 51,637
Int. Cl. H01f 3/02
U.S. Cl. 117—234                                12 Claims

ABSTRACT OF THE DISCLOSURE

Method for forming a protective coating on an article of manufacture, such as a core formed from a stack of magnetic laminations. The material from which the protective coating is formed contains magnetic particles. Each core is carried by a different one of a plurality of article support and masking assemblies mounted on a first conveyor; e.g., a first rotary indexing assembly which rotates each of the support and masking assemblies sequentially through an Article-Loading Station, Material-Applying Station, Article-Transferring Station, and an Article Support-Cleaning Station. At the Article-Transferring Station, the core is transferred to a Magnetizing-Article Compressing Station, which transports the coated core to an Article-Unloading Station on a second conveyor. At the Magnetizing and Compressing Station, a magnetic field magnetically compresses the laminations and concurrently magnetically draws the protective coating material to selected surfaces of the core in order to form an increased thickness of coating material on those selected surfaces. Each of the support and masking assemblies is connected through a rotary valve to a fluid pressure source which feeds fluid through the assembly to accomplish masking and cooling of selected regions of the core. At the Article Support-Cleaning Station each support and masking assembly is mechanically cleaned to remove any residual protective coating material therefrom before the assembly is again indexed to the Article-Loading Station.

CROSS REFERENCE TO RELATED APPLICATIONS

This application is a division of my co-pending application. Ser. No. 803,036, filed Feb. 27, 1969 which issued as Pat. No. 3,607,553 on Sept. 21, 1971 and which is assigned to the same assignee as the present application.

The following co-pending applications, assigned to the same assignee as the present application and some of which have now issued as patents, are expressly incorporated by reference in the present application:

Method of Controlling the Coating of Selected Surfaces of an Article of Manufacture, Louis W. Pieper and Robert O. Kerr, Ser. No. 710,103, filed Mar. 4, 1968, now abandoned;

Composition and Process for Producing Resinous Laminations, F. C. Avila, Ser. No. 803,034, filed Feb. 27, 1969;

Apparatus for Compressing a Laminated Article and for Forming a Protective Coating of Insulating Material on an Article, Marion W. Sims, Pat. No. 3,616,056, which issued Oct. 26, 1971;

Fluidic Coating Nozzle and Air Mask for Article Being Coated, Harold L. Fritzsche, Ser. No. 802,795, filed Feb. 27, 1969 and now abandoned, and the disclosure of which is contained in an application filed on Nov. 25, 1969 in the name of Harold L. Fritzsche and having the title Fluidic Coating Nozzle and Air Mask for Article being coated, and which is a continuation-in-part thereof, Ser. No. 879,664; and now U.S. Pat. No. 3,696,780.

Apparatus for Compressing Laminated Cores, Harold L. Fritzsche, Pat. No. 3,579,788, which issued May 25, 1971.

BACKGROUND OF THE INVENTION

This invention relates to improved methods for producing a protective coating on a surface of a manufactured article. More particularly, the invention relates to improved methods especially effective in producing an integral insulation coating fused or otherwise bonded on selected surfaces of magnetic cores and in forming on certain regions of the cores, such as corners, a protective coating having relatively greater thicknesses than would otherwise be achieved.

In the formation of bondable protective coatings on selected surfaces of an article of manufacture, for example, formation of an insulating resin layer on slot walls, selected corners, and edges of a magnetic core, one of the more attractive approaches especially from the standpoint of article surface coverage and overall cost, is that disclosed in the U.S. Pat. No. 3,136,650 issued to Frank C. Avila on June 9, 1964. In this approach, in one form, magnetic particles in a liquid layer of fusible coating material are magnetized to cause the layer to build up or attain a greater thickness than would otherwise occur at selected surfaces of the article, for instance, at corners or edges.

SUMMARY OF THE INVENTION

An object of the invention is to provide further improved methods for forming on an article of manufacture an integral and protective coating from bondable material.

A more specific object of the invention is to provide improved methods for automatically handling an article of manufacture during various stages in the formation on an article of manufacture of a protective coating from bondable material intermixed with magnetic particles.

In carrying out the objects in one form I provide an improved method for forming a protective coating on an article of manufacture, such as a core formed from a stack of magnetic laminations, which is especially effective when the material from which the protective coating is formed contains magnetic particles. Each core is carried by a different one of a plurality of article support and masking assemblies mounted on a first conveyor; e.g., a first rotary indexing assembly which rotates each of the support and masking assemblies sequentially through an Article-Loading Station, a Material-Applying Station, an Article-Transferring Station, and an Article Support-Cleaning Station. At the Article-Transferring Station, the core is directly transferred from the support and masking assembly into an electromagnet assembly of a Magnetizing-Article Compressing Station where a magnetic field magnetically compresses the laminations and concurrently magnetically draws the protective coating material to selected surfaces of the core in order to form an increased thickness of coating material on those selected surfaces when needed. This latter station may include one or more assemblies which may be mounted on a conveyor such that a final Article Unload Station is disposed in spaced relation to the Article-Transferring Station to facilitate manufacture of the article. At the Article Support-Cleaning Station each support and masking assembly is mechanically cleaned by a unit longitudinally movable relative to the support and masking assembly to remove any residual protective coating material therefrom before it is again indexed to the Article-Loading Station.

The subject matter which I regard as my invention is particularly pointed out and distinctly claimed in the concluding portion of this specification. The invention itself, however, both as to its organization and method of operation, together with further objects and advantages thereof, may best be understood by reference to the following description taken in connection with the accompanying drawings.

BRIEF DESCRIPTION OF THE DRAWINGS

FIG. 2 is an enlarged side elevational view, partially in cross-section, of one kind of material-applying components which may be used in the practice of one form of method and may be incorporated into the apparatus of FIG. 1 at Material-Applying Station B for applying protective coating material during the coating portion of the operating cycle, on the selected surfaces while concurrently masking certain other surfaces not desired to be coated;

FIG. 3 is a partly exploded view in perspective of one type of article support and masking assembly which may be incorporated in the apparatus of FIGS. 1 and 2;

FIG. 4 is a view taken along line 4—4 of FIG. 2 in the direction of the arrows;

FIG. 5 is a sectional view of one of the material-applying devices, revealed in FIG. 2, during the non-material-applying part of the operating cycle;

FIG. 6 is a view taken along line 6—6 in FIG. 5 in the direction of the arrows;

FIG. 7 is a side view, partially broken away, of one arrangement for controlling the angular position of the article support and masking assembly;

FIG. 8 is a fragmentary view of a portion of the arrangement seen in FIG. 7, revealing the article support and masking assembly of the FIG. 7 exemplification released for relative rotation with respect to the material-applying devices.

FIG. 9 is a fragmentary side view, partly broken away and in section, of another type of article support and masking assembly and related components especially effective when used in connection with unbonded laminated articles, for instance, magnetic cores;

FIG. 10 is a view taken along the line 10—10 in the direction of the arrows in FIG. 9.

FIG. 13 is a side elevational view of the primary components of the apparatus shown in FIG. 1 for transferring the article from the article support and masking assembly at Station C into a magnetizing-article compressing assembly of Station D;

FIG. 14 is a view taken along line 14—14 in the direction of the arrows in FIG. 13;

FIG. 15 is a sectional view, reduced in scale, taken along line 15—15 in FIG. 13 as indicated by the arrows;

FIG. 16 is a sectional view, with parts broken away, along line 16—16 in FIG. 13;

FIG. 17 is an enlarged fragmentary view of a part of the laminated core article in the illustrated exemplification after the coating has been formed on the selected surfaces thereof;

FIG. 18 is a sectional view taken along line 18—18 in the direction of the arrows in FIG. 17;

FIG. 19 is a view in section taken along line 19—19 in the direction of the arrows in FIG. 17;

FIG. 20 is an elevational view, partially broken away and partially in section, of an assembly of the apparatus of FIG. 1 disposed at the Article Support-Cleaning Station F;

FIG. 21 is a partial view of a portion of the assembly of FIG. 20, looking toward the left in FIG. 20;

FIG. 22 is a partial view, in perspective, of the assembly of FIG. 20 cleaning portions of the article support and masking assembly in Station F;

FIG. 25 is a schematic or diagrammatic illustration of a variation of the Magnetizing-Compressing Station D illustrated in FIGS. 1 and 23.

DESCRIPTION OF THE PREFERRED EMBODIMENTS

Figure 1:
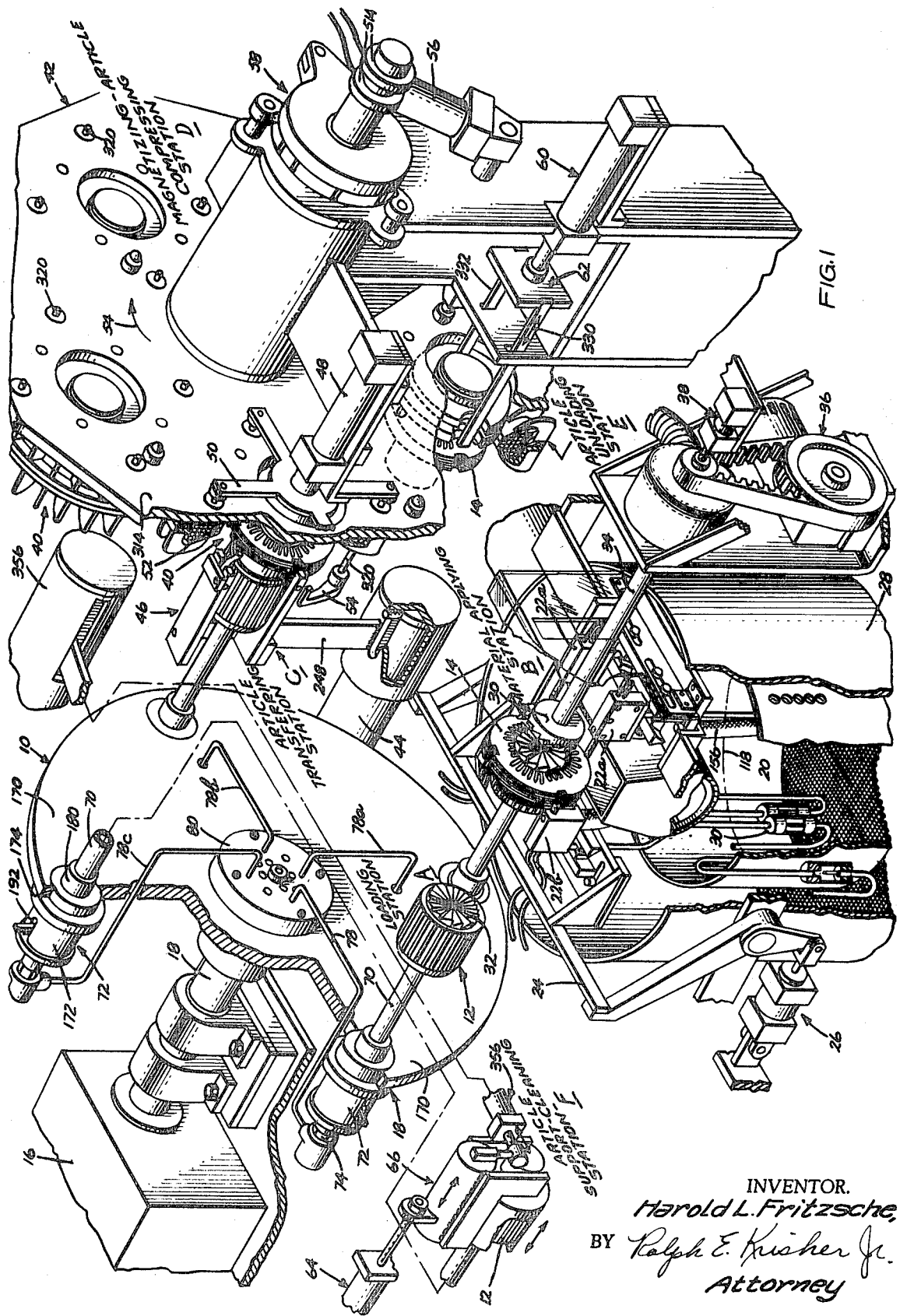
FIG. 1 is a view in perspective of one form of improved apparatus, that may be used in the practice of one form of the inventive method, shown in connection with the formation of a protective coating on selected exposed surfaces of a laminated article of manufacture, which is illustrated as a laminated dynamoelectric machine stator core.

One form of apparatus that may be used to practice the inventive method, in one form, is especially adapted for use in connection with the manufacture of magnetic cores and is illustrated in FIG. 1. The apparatus consists of a Loading Station A, a Material-Applying Station B, an Article-Transferring Station C, a Magnetizing-Article Compressing Station D, an Article-Unloading Station E, and an Article Support-Cleaning Station F.

Loading Station A includes a conveyor in the form of rotary indexing assembly 10 carrying four equally spaced article support and masking assemblies 12, each of which is adapted to support or hold an article of manufacture, such as a laminated magnetic core 14, having a central bore therein. A prime mover 16 drives a shaft 18 which is fixed to the indexing assembly 10. The indexing assembly is sequentially driven or indexed through 90° arcs. Although support and masking assembly 12 may take any suitable configuration depending upon the article being coated, in the present exemplification, it is of the type described in detail in the above mentioned co-pending application, Ser. No. 879,664, and is illustrated in more detail in FIG. 2.

A pre-heated core 14 is loaded onto a support assembly 12 at position 18 of the indexing assembly 10, either manually or automatically, and then the support assembly carrying the core is rotated 90° to Material-Applying Station B where heat-hardenable, bondable material 20 having magnetic particles therein is applied to selected surfaces of the core by means of material-applying devices, such as nozzle assemblies 22a and 22b. Nozzle assemblies 22b are mounted on a rocker arm assembly 24 actuated by an air cylinder assembly 26 to swing the nozzles 22b out of the path of the support and masking assembly 12 carrying a core 14 as it enters and leaves the Material-Applying Station B.

The coating material 20 is contained in a fluidized bed within a supply tank 28. When the material contains magnetic particles, it may be of the type disclosed in the Avila Pat. 3,136,650 or in the co-pending Avila application Ser. No. 803,034. Suitable aspirating pumps, such as pump 30, pumps the material to the nozzle assemblies 22a and 22b which, due to the construction of assembly 10, may be of the highly desirable fluidic-control type as described in more detail in co-pending application Ser. No. 879,664.

During the material-applying step, the support and masking assembly 12 carrying core 14 is rotated approximately 360° by means of a serrated member 30 which meshes with the serrated surface 32 on the end of each assembly 12. The serrated member 30 is fixed to a shaft 34 which is rotated by suitable driving means 36. The serrated member 30 is driven longitudinally into and out of engagement with the serrated surface 32 on the end of support assembly 12 by means of an air cylinder assembly 38 which is coupled to the end of shaft 34 opposite from the end of the shaft carrying the serrated member 30.

After the material has been applied to the desired surfaces of core 14 at Station B, for instance to core side faces, slots, and slot edges in the illustrated embodiment, rocker arm assembly 24 carrying the nozzle assemblies 22b swings away from the core, and serrated element 30 is disengaged from the serrated surface 32 on support assembly 12 so that indexing assembly 10 may be rotated another 90° so that the support assembly 12 carrying the coated core 14 is now positioned in the Article-Transferring Station C. At this station, the core 14 is removed from the article support and masking assembly 12 and rapidly transferred to the Magnetizing-Article Compressing Station D where it is received in an article-compressing assembly 40. Any suitable arrangement may be utilized for assembly 40, the illustrated structure being similar to that disclosed in my co-pending application Pat. No. 3,579,788. Also, the exact number of assemblies 40 used will be dependent upon such variables as the type of material employed as the insulating material (e.g., whether or not it includes magnetic particles, length of time desired for the coated core to be retained in assembly 40), among other considerations. In the first illustrated embodiment, five assemblies 40 are mounted on a conveyor of the rotary type, such as rotary indexing assembly 42 having one of the assemblies 40 in axial register with assembly 12 carrying a coated core at Station C.

The details of a magnetizing-article compressing assembly are illustrated in FIGS. 13–17 and will be discussed in more detail below.

At the Article-Transferring Station C, an air cylinder assembly 44 drives an article-removing member 46 towards index assembly 42 to slide the core from the support and masking assembly 12 into the magnetizing-article and compressing assembly 40.

Another air cylinder assembly 48 operates a spider 50 to which there are attached four rods 320, each of which carries a C-shaped clamp 54 at the end thereof. In FIG. 1, the air cylinder assembly has driven the spider towards the support and masking assembly 12 thereby driving the C-shaped clamps 54 towards the support and masking assembly and also rotating the clamps outwardly away from the magnetizing-article compressing assembly. Once the article-transferring assembly 46 has transferred the core 12 to the magnetizing-article compressing assembly 40 in axial register with it, air cylinder 48 drives spider 50 in a direction away from the support and masking assembly 12, thereby causing the C-shaped clamps 54 to cam inwardly toward assembly 40 and to engage the outer lamination of the core, thereby assisting in the clamping of the core on the magnetizing-article compressing assembly 40. The air cylinder 44 is also actuated to drive the article-transferring assembly 46 away from the Magnetizing-Article Compressing Station D.

Associated with each magnetizing-article compressing assembly 40 is a doughnut-shaped electromagnet assembly 52 to which direct current is supplied to provide a unidirectional magnetic field which draws the coating material containing magnetic particles to selected surfaces of the core to thereby provide an increased thickness of coating material at those selected surfaces. After a core is loaded onto a magnetizing-article compressing assembly at the Transferring Station C, the indexing assembly 42 is rotated 60° in a clockwise direction as indicated by arrow 54 to bring the next magnetizing-article compressing assembly into position at Transferring Station C. The magnetizing field is applied to the core as it is rotated from Article-Transferring Station C until it reaches Article-Unloading Station E where the DC current is disconnected from the electromagnetic assembly 52, thereby interrupting the magnetic field. However, at this time, the heat-hardenable material has formed into an adherent integral Protective coating on the core. The indexing assembly 42 is driven through its series of 72° arcs by means of an air cylinder assembly 56 which drives a ratchet assembly 58 which in turn drives the indexing assembly 42. At Article-Unloading Station E, an air cylinder assembly 60 drives an article unloader assembly 62 which pushes the core 12 out of the magnetizing-article compressing assembly 40. After the core is removed from the magnetizing-article compressing assembly 40, air cylinder assembly 60 drives the unloading assembly 62 away from the magnetizing-article compressing assembly so that it is in a position to remove the following core from the magnetizing-article compressing assembly.

Turning now more specifically to the rotary indexing assembly 10, after an article-supporting masking assembly 12 has been indexed from the Article-Transferring Station C to Article Support-Cleaning Station F, an air cylinder assembly 64 actuates an article support-cleaning assembly 66 which scrapes excess coating material from the surfaces of the article support and masking assembly 12, preparatory to indexing of the support and masking assembly to the Loading Station A. The article support-cleaning assembly is illustrated in detail in FIGS. 20–22 and will be described in more detail below.

FIG. 2 illustrates the details of Material-Applying Station B and also, along with FIG. 3, illustrates details of the core support and masking assembly 12 used in the exemplification. Both the Material-Applying Station B and the structure of the core support and masking assembly 12 are disclosed in detail in co-pending application, Ser. No. 879,664 and they will be described only briefly here. The core support and masking assembly 12 is supported for rotation with respect to the generally opposed material-applying devices 22a and 22b whose detailed structure is also disclosed in the aforesaid co-pending application and which is also illustrated in more detail in FIGS. 2, 4, 5 and 6 of the present application.

In addition to supporting the core 14, the support and masking assembly 12 is also used to prevent coating of the bore of the core and the sides of the teeth of the core. A further desirable feature is the prevention of contamination of the support and masking assembly itself. The core support and masking assembly 12 and rotatable outer tube 70 are supported by the perforated tube 74 which in turn is supported in a bearing assembly 72 (as shown in FIG. 1). The bearing assembly 72 is fixed to the rotary indexing assembly 10. As illustrated in FIGS. 1 and 2, the tube 74 is perforated and is connected via a conduit 78, a fluid distribution plate 80 and the hollow shaft 18 to a suitable source of fluid pressure, such as compressed air. The end of outer tube 70 forms a sleeve valve for the perforated end of the inner tube 74 within the core support and masking assembly 12. The rotatable outer tube 70 carries a flange 82 in which is mounted an O-ring seal 86. Masking of the selected surfaces of the core 14 is achieved in the manner described in my co-pending application Ser. No. 879,664. If desired, assembly 12 may take other suitable forms, for instance, the kind of physical masks shown in U.S. Pats. 3,355,309 and 3,355,310 may be utilized.

The core support and masking assembly includes a support cylinder 88 having a bore of a diameter on the order of that of flange 82 such that the flange slides within the bore of the cylinder. The cylinder is provided with radial perforations 90, while the inner tube 74 is also provided with radial bores 92 about its periphery. Inner tube 76 terminates in a flange 94 having an outside diameter which is also on the order of that of the inside diameter of cylinder 88.

Cylinder 88 has a plurality of peripherally spaced ribs 96 between each pair of which is a pair of fins 98 formed of insulative material strips that in turn sandwich a bored quadrant 100. Radial bores 102 are formed in the quadrants 100 and aligned with the radial bores 90 of cylinder 88. The radial height of the ribs 96 is slightly in excess of the radial height of the fins and bored quadrants. The mask is therefore assembled from circumferential sections composed of bored quadrants and fins. The pre-heated core 14 is thermally insulated from ribs 96 by the fins 98. Circumferentially extending slots 104 are provided at longitudinally spaced locations along the outer surface 106 of the bored quadrants to control the thermal gradient existing between the pre-heated core and the support and masking assembly 12. As best shown in FIG. 2, core 14 is supported on the surfaces of the quadrants 100 as the core supported masking assembly is rotated. Air passing through the bores 102 prevents coating of the bore surface or tooth faces of the core 14. Furthermore, the ribs 96 direct the air to prevent coating of the restricted slot entrance surfaces defined by the core teeth.

A flanged circular end frame 108 on the right-hand end of the assembly 12 and an annular flanged ring 110 on the left-hand end are coupled by bolts 112 and 114 to respective ends 116 of cylinder 88 to complete the core support and masking assembly 12 and clamp the fins 98 and bore quadrants in position. The outer surface 32 of the circular end frame 108 is serrated to receive the serrated driving member 30 carried by the rotating drive shaft 34.

The outer tube 70 is graduated with numbers that may be arranged to represent various thicknesses of cores 14 which can be accommodated by the core support and mask assembly 12.

Air cylinder assembly 38 in FIG. 1 selectively drives serrated member 30 into and out of engagement with the serrated surface 32 of member 108 thereby selectively rotating the core support and mask assembly 12 as the drive motor assembly 36 rotates shaft 34.

The structure and operation of the illustrated nozzle assemblies 22a and 22b are also described in detail in the co-pending application Ser. No. 879,664 but will be summarized briefly here with reference to FIGS. 2, 4, 5 and 6 taking nozzle assembly 22a as an example. The pneumatic aspirating pump 30 associated with nozzle assembly 22a and disposed beneath the surface 118 of the fluidized bed of coating material containing magnetic particles in supply tank 28 is supplied with pressurized air to force the coating material vertically upward through a conduit 120 which is in communication with the nozzle assembly. The conduit passes through a block 122 carried by longitudinally adjustable support member 124 which is provided with a slotted laterally extending member 126 and also includes adjustable mounting bolts 128, for example, for permitting lateral adjustment of the position of nozzle assembly 22a with respect to the longitudinal center line of the Material-Applying Station B. Block 122 is positioned within slotted support 124 aligned with the longitudinal axis of the Station B, and screws 130 allow adjusting of the longitudinal position of the nozzle assembly. Thus, each nozzle assembly may be adjusted in the horizontal plane along a line parallel to the longitudinal axis of the Material-Applying Station B and at right angles thereto.

The nozzle assembly 22a comprises a block 131 of metal or plastic material containing a recess defined by spaced walls 134 and 135 and including an inlet or ingress channel 138. Also formed in the block is a control or fluid interaction chamber 140 defined in part by a curved passageway wall 142. A first outlet or egress channel 144, in this case, is formed by a coating nozzle 146 disposed at right angles to the inlet channel 138; and a second outlet or egress channel 148 is generally parallel to inlet channel 138. The second outlet channel 148 is also defined by a pair of spaced walls.

Also formed in block 131 is a first pressurized fluid control or spray air channel 152 of relatively small diameter whose axis is aligned with the axis of outlet channel 144 formed by nozzle 146. A second control channel 154 is inclined to outlet channel 144 and is in communication with the interaction chamber through an opening in the curved passageway wall 142. The control channels 152 and 154 are coupled respectively to a source of pressurized spray air and control air. A flexible return tube 156 is coupled between the second outlet channel 148 and the supply tank 28.

FIG. 6 is a cross-sectional view taken along lines 6—6 of FIG. 5. A rectangular recess 158 is formed within the block 132 which receives the inner end of nozzle 146. The first outlet channel 144 of the nozzle assembly 22a is divergent from its inner end to the nozzle outlet end 160, while the fluid interaction chamber 140 in the vicinity of the curved passageway wall 142 converges as indicated by the tapered side walls 162. Furthermore, the first fluid control channel 152 is circular in configuration at the point where it enters the interaction chamber 140, while the second control channel 154 is rectangular in configuration and has a transverse dimension which is much greater than its dimension in the direction of the fluid flow.

The nozzle assembly operates under fluid control principles involving the employment of a control stream of relatively small flow energy for controlling a power stream of much greater energy. In FIG. 2, arrows 164 indicate the application of a spray signal in the form of a low energy pressurized fluid stream applied to conduit 166 which is in communication with the control channel 152.

The control stream passes from the channel 152 into the interaction chamber 140 discharging therein adjacent the curved passageway wall. Fluid air under pressure (e.g., less than 5 p.s.i.) also passes through the aspirating pump 30 which acts to discharge the fluidized coating material 20 through conduit 120 into the inlet channel 138 of the nozzle assembly 22a. The application of the spray signal to the first control passage 152 causes the fluidized material to be fed at some velocity through the nozzle 146 where it discharges from the exit end thereof to coat selected surfaces of the core 14 or other article present in the Material-Applying Station B.

When a second fluid control signal in the form of low energy fluid stream is applied to the conduit 168, the stream passes through channels 155 and 154 into the interaction chamber 140 where it immediately diverts the power stream of coating material flowing through the interaction chamber 140 from the first outlet passage 144 in nozzle 146 to the second outlet passage 148 which is in communication with the flexible return to 156 which directs the diverted stream to the supply tank 28.

FIG. 5 illustrates the condition in which there is either no or a very weak spray signal applied to the conduit 166 but in which a positive fluid control signal as indicated by the arrow 170 is applied to the conduit 168. In this case, a fluid control signal passes through the conduit 168 to the channels 155, 154 to divert the power stream to the return tube 156. When the spray signal applied to conduit 166 is terminated or significantly reduced and a positive control signal is applied to the conduit 168, the coating material continues to recirculate through the return conduit 156, supply tank 128, the conduit 120 and the nozzle assembly 22a. When the control signal is applied to conduit 168, the discharge of the powder coating material from the exit end 160 of nozzle 146 ceases immediately without the loss of any coating material and with very little power input required. The coating material is continuously recirculated while the indexing assembly 10 is rotated until the next core or other article to be coated is rotated into the proper position in Material-Applying Station B.

While the aspirating pump which directs the powdered coating material from supply tank 28 to the interaction chamber 140 in nozzle assembly 22a would be sufficient to assure passage of some of the powder through the nozzle 146 onto the article to be coated, the presence of the first control passage 152 generally aligned in the direction of fluid flow through the nozzle 146 causes the application of additional pressurized air to increase the velocity of the coating material as it passes through the nozzle 146 and also to cause further mixing and dispersion of the powder in the air stream. Thus, such a fluid controlled nozzle assembly provides means for independently controlling the powder content and the mixture velocity at the exit end 160 of nozzle 146.

FIGS. 7 and 8 illustrate the details of one of the bearing assemblies 72 which are mounted in the dial plate 170 of the rotary indexing assembly 10 illustrated in FIG. 1. This bearing assembly contains means for normally locking the article support and masking assembly 12 against rotation except during the time material is being applied to the article in the Material-Applying Station B.

Bearing assembly 72 comprises a cylindrical housing 172 which is mounted in a suitable opening in dial plate 170 and fixed thereto. Fixed to one end of the housing is a collar 174 which is also fixed to the dial plate 170 thereby rigidly mounting housing 172 to the dial plate 170. Supported within the housing 172 are bearings 176 and 178 which in turn support for rotation a tube 180 which is fixed to the hollow shaft 74 which carries the support and masking assembly 12. Fixed to the opposite end of the hollow shaft 180 is a collar 182 having a bore 184 extending therethrough at a point near its outer periphery and adapted to receive a pin 186 which is slidable within a channel 188 formed in housing 172. A tang 190 is fixed to pin 186 and extends through a slot 192 in housing 172. A spring 194 disposed in channel 188 normally biases pin 186 so that it extends through the bore 184 in collar 182, thereby locking shaft 182 against rotation which in turn locks the core support and masking assembly 12 against rotation. Pin 186 is maintained in its locking position for all positions of the dial plate 170 of rotary indexing assembly 190 except when its associated core support and masking assembly 12 is being rotated at Station B during the time when the nozzle assemblies 22a and 22b are applying material to selected surfaces of the core 14. This locking feature is important because the core support and masking assembly 12 must be maintained in a properly oriented angular position in both the Article-Transferring Station C and the Article Support-Cleaning Station F.

The hollow shaft 180 is unlocked by applying to a pin actuator 196 a force in the direction of arrow 198 to force the pin 186 out of the channel 184 in collar 182 against the force of the biasing spring 194. The force applied to the actuator pin 196 may be provided by the piston of an air cylinder assembly (not shown) for example. FIG. 7 shows the pin in its locked position and FIG. 8 shows the pin in its unlocked position.

The article support and masking assembly 12 illustrated in FIGS. 1, 2 and 3 is particularly applicable for use with laminated magnetic cores of the bonded type, i.e., of the type wherein during the fabrication of the core from the laminations, the laminations are bonded together by a suitable adhesive that forms of an interlaminate bond as disclosed, for example, in U.S. Pat. No. 3,299,304 of B. B. Hull, issued Jan. 17, 1967.

The present invention is also applicable to unbonded cores since the laminations of the core may be bonded together by the coating material 20 which is applied by the nozzle assemblies 22a and 22b. In this case, it is necessary to provide means for clamping the laminations of the core together during the material-applying operation when the core is mounted on the article support and masking assembly and the Material-Applying Station B. FIG. 9 illustrates a modified core support and masking assembly 200 which provides this clamping function. The modified assembly also includes an inner perforated tube 202 upon which slides outer tube 204. The outer tube 204 includes clamping fingers 206 which extend through guide slots 208 and 210 formed in the outer support cylinder 212 and quadrants 214, respectively. Again, the quadrants 214 and insulating fins 216 are disposed between the projecting ribs 217 of assembly 200. The tooth sections 222 of the individual laminations 224 forming the unbonded core 226 are positioned between the ribs and rest on the surfaces of the quadrants. The tips 228 of the fingers 206 abut against the outer lamination 230 of core 226 when the opposite end lamination 232 is engaged by stops 234 mounted circumferentially around a movable collar 236. Consequently, fingers 206 and stops 234 serve to compress together the unbonded laminations forming the core 226. Collar 236 is fixed to a shaft 238 which can be both rotated and also moved longitudinally. Also fixed to shaft 238 is a coupling 240 adapted to receive one or more pins 242 fixed to the core support and masking assembly 200. During operation, the ends of the tooth sections 222 that define the bore of the core rest on an upper segment of the assembly 200. As the core is rotated, it shifts slightly relative to the assembly 200, and continues to be supported by an upper segment of the assembly.

When it is desired to rotate the core support and masking assembly 200 in order to rotate the core 226 through an arcuate path between the nozzle assemblies 22a and 22b during a material-applying operation, the various parts are in the positions illustrated in FIG. 9, i.e., shaft 238 is forced to the left so that the core laminations are clamped between the stops 234 and the tips of fingers 206, and coupling 240 is in engagement with pins 242 so that rotary motion applied to the shaft 238 also rotates the core support and masking assembly 200 carrying the core 226.

The lower part of FIG. 9 illustrates one means by which the longitudinal and rotary motion may be applied to the shaft 238 to provide the rotary and drive and compressing action. A drive motor 244 rotates a shaft 246 which is coupled to a suitable clutch and brake assembly 248 which in turn is coupled by means of a drive belt 250 to the shaft 238. Furthermore, a suitable actuator such as an air cylinder 252 actuates a suitable linkage 254 coupled to a collar 256 on the end of shaft 238 to impart the selective reciprocal longitudinal motion to the shaft 238 to lock and unlock the coupling 240 and the pins 242 on the core support and masking assembly 200. Air masking is achieved in the same manner as described for the core support and masking assembly 12 illustrated in FIGS. 2, 3 and 4.

Figure 11:
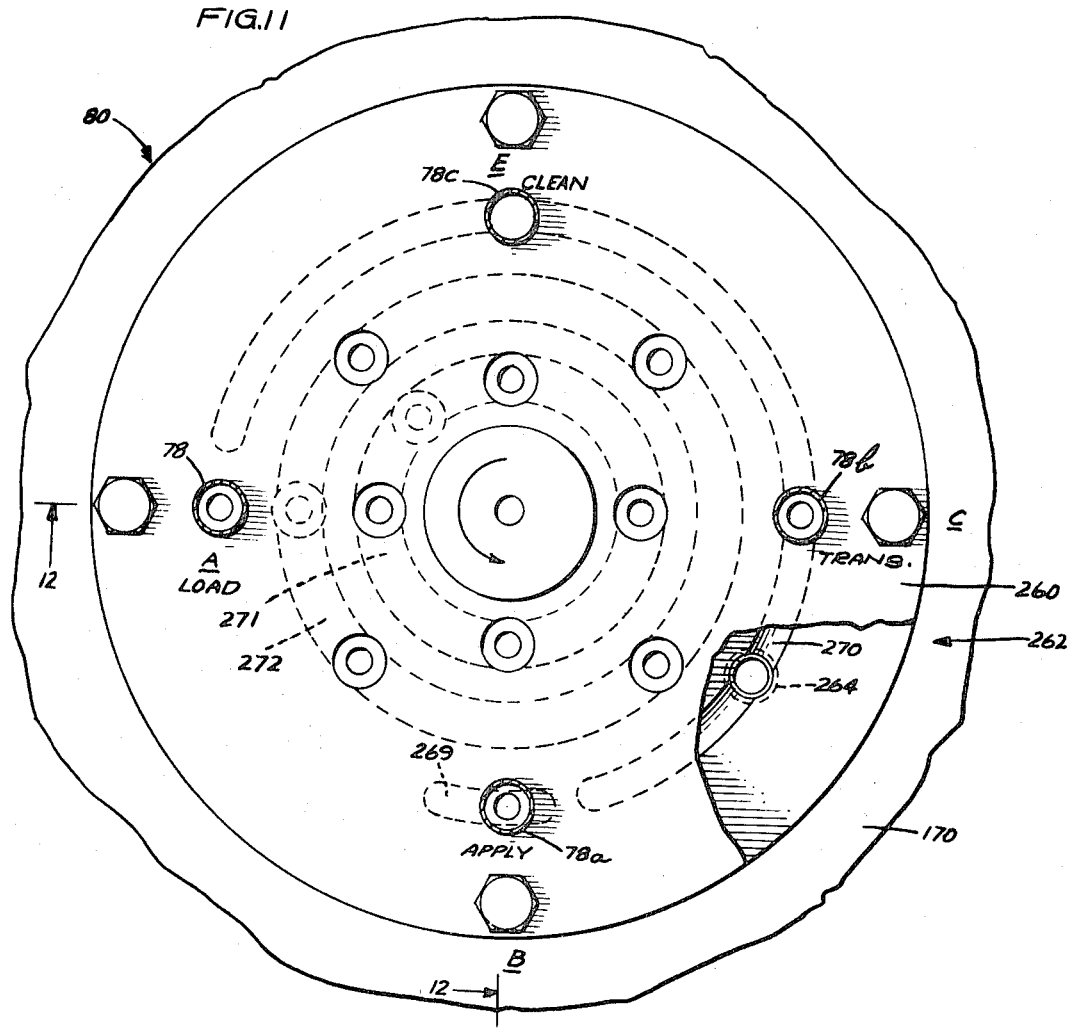
FIG. 11 is a front view, partly broken away, of the rotary fluid control valve assembly for concurrently regulating fluid flow to the individual article support and masking assemblies.
Figure 12:
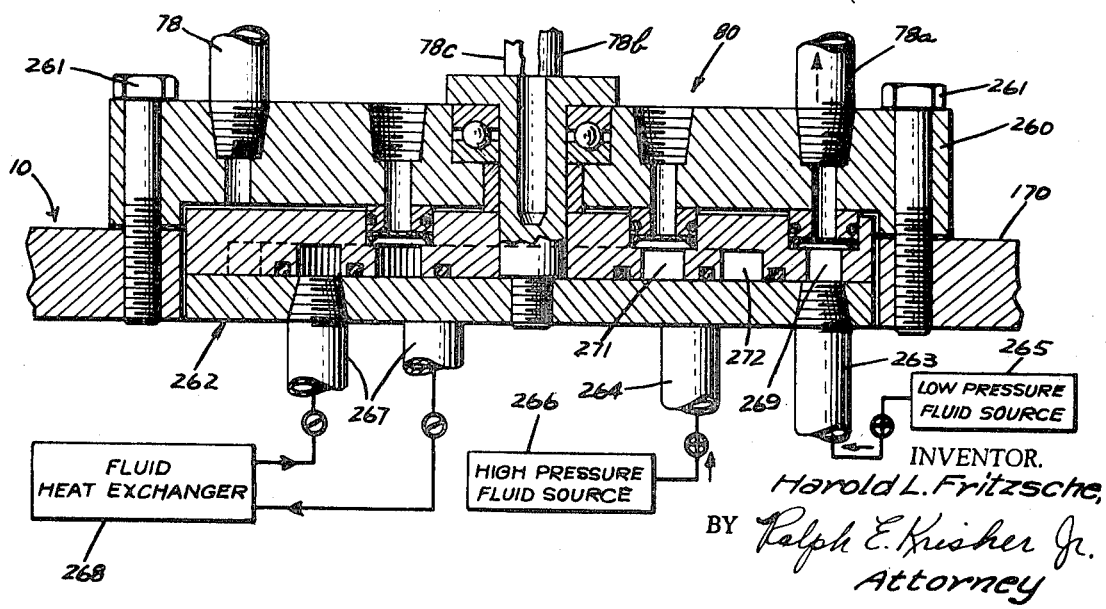
FIG. 12 is a view taken along line 12—12 in FIG. 11 in the direction of the arrows, the view schematically showing the connection of the rotary fluid control valve assembly to appropriate fluid sources.

FIGS. 11 and 12 illustrate in detail the rotary fluid control valve assembly 80 which is mounted on the dial plate 170 of the rotary indexing assembly illustrated in FIG. 1. This control valve assembly provides for concurrently regulating fluid flow to the four individual article support and masking assemblies 12 mounted in the dial plate. The valve also contains various ports and passageways for controlling the distribution of the flow of a fluid coolant for a core support and masking assembly of the type illustrated and described in co-pending application Ser. No. 710,103, now abandoned.

Only the portions of the valve assembly 80 used for the apparatus of FIG. 1 will be described in detail. The operation of the valve assembly will be described with reference to the manner in which it controls the supply of masking air to the core support and masking assembly 12 which is supplied with air from the valve assembly 80 via the pipe 78 on the rotary indexing assembly 10. The pipes supplying air to the other three support and masking assemblies will be identified as 78a, 78b and 78c.

Let us first look at the structure of the valve assembly 80. It comprises a rotatable plate 260 secured by bolts 261 to the dial plate 170 of the rotary indexing assembly 10. Therefore, the plate 260 and dial plate 170 rotate relative to a fixed plate 262 assembly to which are coupled conduits 263 and 264. A low pressure fluid source 265 is coupled to conduit 263, and a high pressure fluid source 266 is coupled to conduit 264. Also coupled to plate assembly 262 are a pair of conduits 267 which are also coupled to the inlets and outlets, respectively, of a heat exchanger 268 which may be used for the core support and masking assembly disclosed in the aforementioned application Ser. No. 710,103, now abandoned.

Formed in fixed plate assembly 262 is a relatively short arcuate groove 269 which is in communication with the pipe 78a when the article support and masking assembly associated therewith is in the Material-Applying Station B. Consequently, while an article support and masking assembly 12 is in Station B, and also for a short distance before it enters the station and after it leaves the station, low pressure fluid, such as air, is supplied to the assembly 12 to provide masking of selected surfaces of the core 14.

Also formed in plate 262 is a relatively long arcuate groove 270 which, in the counterclockwise direction, begins shortly after Station B and ends just before Loading Station A. Conduit 264 is in communication with groove 270. High pressure fluid, such as air, is applied to the pipes 78, 78a, 78b, 78c when they are in communication with groove 270. This fluid functions both to cool and clean the core support and masking assembly 12.

Also formed in fixed plate assembly 262 are two radially spaced circular grooves 271 and 272 each of which is in communication with a different one of the heat exchanger conduits 267.

By correlating FIGS. 11 and 12 with FIG. 1, it can be seen that, when a core support and masking assembly 12 is in loading Station A, its associated pipe 78 is not in communication with any groove in plate assembly 262, and therefore, no masking or cleaning air is applied to the assembly. However, assuming that dial plate 170 is rotated in a counterclockwise direction, pipe 78 will communicate with the groove 269 in the Material-Applying Station B, thereby applying low pressure masking fluid, for instance below 9 p.s.i., to the assembly while the coating material is being applied by the nozzle assemblies 22a and 22b. As the pipe 78 moves away from Station B, it moves out of communication with groove 269 and the masking air is interrupted. However, as the core support and masking assembly continues to move toward the Article-Transferring Station C, the pipe 78 comes into communication with the groove 270 so that high pressure fluid (e.g., in the order of 60 p.s.i.) is now applied to the assembly to cool and clean it. As seen from the arcuate extent of the groove 270, this high pressure cooling and cleaning air is applied to the assembly continuously as it moves through Station C and the Cleaning Station F and is interrupted just before the assembly reaches the Loading Station A again.

FIG. 13 illustrates in more detail the Article-Transferring Station C and the Magnetizing-Article Compressing Station D. The article-transferring assembly 46 is illustrated both in FIG. 13 and also in FIG. 14. The assembly comprises a bracket 280 pivotally mounted by means of a pin 282 to a block 283 which is fixed to an arm 284 which in turn is selectively reciprocated by the air cylinder assembly 44. Bracket 280 has upper and lower arms 286 and 288 carrying pivoted fingers 290 and 292 respectively. These fingers are pivotally mounted to the arms 286 and 288 by means of pins 294 and 296 respectively. When air cylinder 44 is actuated in order to drive the article-transferring assembly 46 toward the Magnetizing-Article Compressing Station D, the fingers 290 and 292 ride on the surfaces of two diametrically opposed ones of the bored quadrants 100 of the core support and masking assembly 12.

The double pivoting action provided by the pins 282, 294 and 296 permits the fingers 290 to simultaneously engage the outer lamination of core 14 while permitting the fingers to slide evenly on the surfaces of the bored quadrants 100. If it were not for this double pivoting action, the fingers would not evenly engage the outer lamination of the core where the lamination contains surface variations at the points engaged by the fingers 290 and 292, thereby creating the possibility that the core would become tilted and jammed on the article support and masking assembly 12. Consequently, the particular structure of the article-transferring assembly 46 permits core 14 to be smoothly and positively removed, in a rapid fashion without the possibility of jamming, from the core support and masking assembly 12 to a magnetizing-article compressing assembly 40 on the rotary indexing assembly 42.

The details of the Magnetizing-Article Compressing Station D are best illustrated in FIG. 13 and also in FIGS. 15 and 16. Even though this form of Station D is the most desirable form, it is to be understood that other forms of a Magnetizing-Article Compressing Station may be used, and may, by way of example, be as disclosed in the copending Sims application Pat. No. 3,616,056.

As illustrated in FIG. 13, the core 14 is pushed by the article-transferring assembly 46 onto a slightly tapered non-magnetic cylindrical member or plug 298 of the magnetizing-article compressing assembly 40. At the time core 14 is being transferred from Station C to Station D, direct current is applied via leads 300 to the electromagnet assembly 52 to generate a magnetic field which assists in the transferring action by magnetically attracting the core to a central position within the area surrounded by the electromagnet assembly 52. The core 14 is moved to the right as viewed in FIG. 13 until it engages four stop members 302 which are fixed to a flange 304 which in turn is fixed to an adjustable collar 305. A set screw 306 normally locks collar 305, flange 304 and stop members 302 to the cylindrical member 298. However, when the set screw 306 is loosened, collar 305 may be moved axially of member 298 so that the axial position of stop members 302 may be adjusted to accommodate cores of different axial lengths or stack heights. The stop members are then locked in an axial position which permits core 14 to be positioned centrally within electromagnet assembly 52 to obtain the maximum benefit from the magnetic field generated during the magnetizing-article compressing operation. At Station E elongated arms 330, 332 of the unload assembly 62 extend through recesses 308 (best shown in FIG. 15) formed in a collar 310 fixed to the inner periphery of electromagnet assembly 52. Collar 310 has a bore for receiving plug 298, which is fixed, as by welding, to collar 310 which mounts the plug within the assembly 52.

The electromagnet assembly 52 is fixed by bolts 313 to the dial plate 314 of indexing assembly 42 and is enclosed by an outer housing 316 containing a plurality of cooling fins 318. The housing also contains four equally spaced bores through each of which passes a shaft 320 carrying one of the C-shaped clamps 54. The shafts 320 are fixed to the spider 50 which in turn is fixed to air cylinder assembly 48. A spring 322 is mounted in each of the holes 324 through which the shafts 320 pass in order to be connected to the spider 50. The spring normally biases the spider assembly to the right as viewed in FIG. 13 thereby normally placing the C-shaped clamps 54 in their clamping position wherein they are rotated inwardly toward the support cylinder 298. Therefore, before a core is transferred from Station C to Station D, air cylinder assembly 48 is energized to push spider 50 to the left thereby pushing the C-shaped clamps 54 also to the left and simultaneously rotating the clamps outwardly from the cylindrical member 298 by virtue of the camming action of a pin 326 fixed to each shaft 54 and traveling in a suitably shaped camming groove formed in the housing 316. When the core is positioned against the stop members 302, air cylinder 48 is deenergized and springs 322 return the C-shaped clamps to their clamping position whereby core 14 is securely clamped between the four clamps 54 and the stop members 302. When the core contains unbonded laminations, this clamping action effectively compresses the laminations together in that region.

Even though it is not illustrated, there is also a spider 50 and a corresponding air cylinder assembly 48 located at the Article-Unloading Station E. When the indexing assembly 42 has rotated a core to Station E, electromagnet assembly 52 is deenergized, the air cylinder 48 is energized to operate spider 50 and unlock the clamps 54, and then air cylinder 60 is energized to push the unload assembly 62 to the left so that the elongated arms 330 and 332 engage the outer lamination of core 14 and push the core off the cylindrical member 298. After the core has been removed, air cylinder 60 is deenergized so that the unload assembly 62 is retracted to its normal position.

FIGS. 17, 18 and 19 illustrate portions of a laminated core 14 after the protective coating 335 has been formed on selected surfaces thereof. The core 14 is illustrated in this exemplification as a laminated stator core having a yoke portion 334 and tooth sections 336 defining winding-receiving slots 338. The coating 335 covers the outer surfaces of the end laminations 340 and 342 and selected walls of the slots 338. However, the masking action of the air supplied through the core support and masking assembly 12 assists in preventing a coating from being formed on the curved end portions 344 and 346 of each tooth section 336. The core support and masking assembly itself masks the bore of the core as defined by the edge of the tooth sections 336 from the coating material. FIGS. 17-19 also illustrate the increased thickness of coating material at the edges and corners of the tooth sections and slots of core 15. This increased thickness is produced by the action of the magnetic field produced by the electromagnet assembly 52 in the Magnetizing-Article Compressing Station D.

FIGS. 20, 21 and 22 illustrate the details of the Article-Support-Cleaning Station F. At this station, air cylinder 64 applies reciprocating motion, indicated by the arrows 350 and 352, to the article support-cleaning assembly 66 such that a plurality of cleaning bars 354 move back and forth across the surfaces of the bored quadrants 100 of article support and masking assembly 12 to scrape excess coating material from the surfaces of the quadrants and from the sides of the ribs 96.

Specifically, the cleaning bars 354 are mounted on the ends of a plurality of elongated cantilever members 356 whose opposite ends are fixed to the periphery of a ring 358 which in turn is fixed to a shaft 360. Members 356 are preferably formed of spring type material, such as steel. A pair of ball bearings 362 are fixed in a cylindrical housing 364 and support shaft 360 for rotation relative to the housing. Fixed to the end of shaft 360 is one end of a wobbler arm 366 whose other end extends into a tapered recess 368 formed in an arm 370 whose upper end is fixed to a shaft 372. The shaft 372 is suitably mounted in a support member 374 for reciprocal longitudinal movement as indicated by the arrow 376.

Slidably mounted on shaft 372 is a sleeve 378 which is fixed to the piston 380 of the air cylinder 64. A pair of L-shaped flanges 382 are fixed as by welding to sleeve 378 and cylindrical housing 364. Consequently, as sleeve 378 is reciprocated by the action of the air cylinder 64, the reciprocal motion is transmitted directly to the cylindrical housing 364 which in turn is fixed to ring 358, thereby longitudinally reciprocating the cleaning bars 354 along one corner formed where the side wall of rib 96 and the associated bored quadrant 100 are joined. After the completion of longitudinal motion in one direction to clean the entire axial length of the corner, air cylinder 356 applies oscillatory motion to the shaft 360 by the wobbler arm 366 thereby causing the bars 354 to move circumferentially across the surfaces of the bored quadrants 100 to the opposite corner and longitudinal movement of the bars on the return stroke cleans that corner. By causing the bars to be resiliently urged against the side walls of the ribs 96 during each longitudinal path of travel, a cleaning action is assured as the bars scrape excess coating material from the corners formed by the ribs 96 and the surfaces of the bored quadrants 100.

Furthermore, a cylindrical housing 385 surrounds the bars 354, and collects the excess coating material scraped off the assembly 12 by the cleaning assembly 66, thereby preventing the material from falling back into the material supply tank 28. Of course, as previously noted, during the cleaning operation, the bearing assembly 72 locks the shaft 180 of the article support and masking assembly 12 against rotation by virtue of the fact that pin 186 is inserted in the bore 184 in the collar 182 (see FIG. 7). Also, high pressure fluid is carried by conduit 78c to assist in the cleaning of assembly 12.

Figure 23:
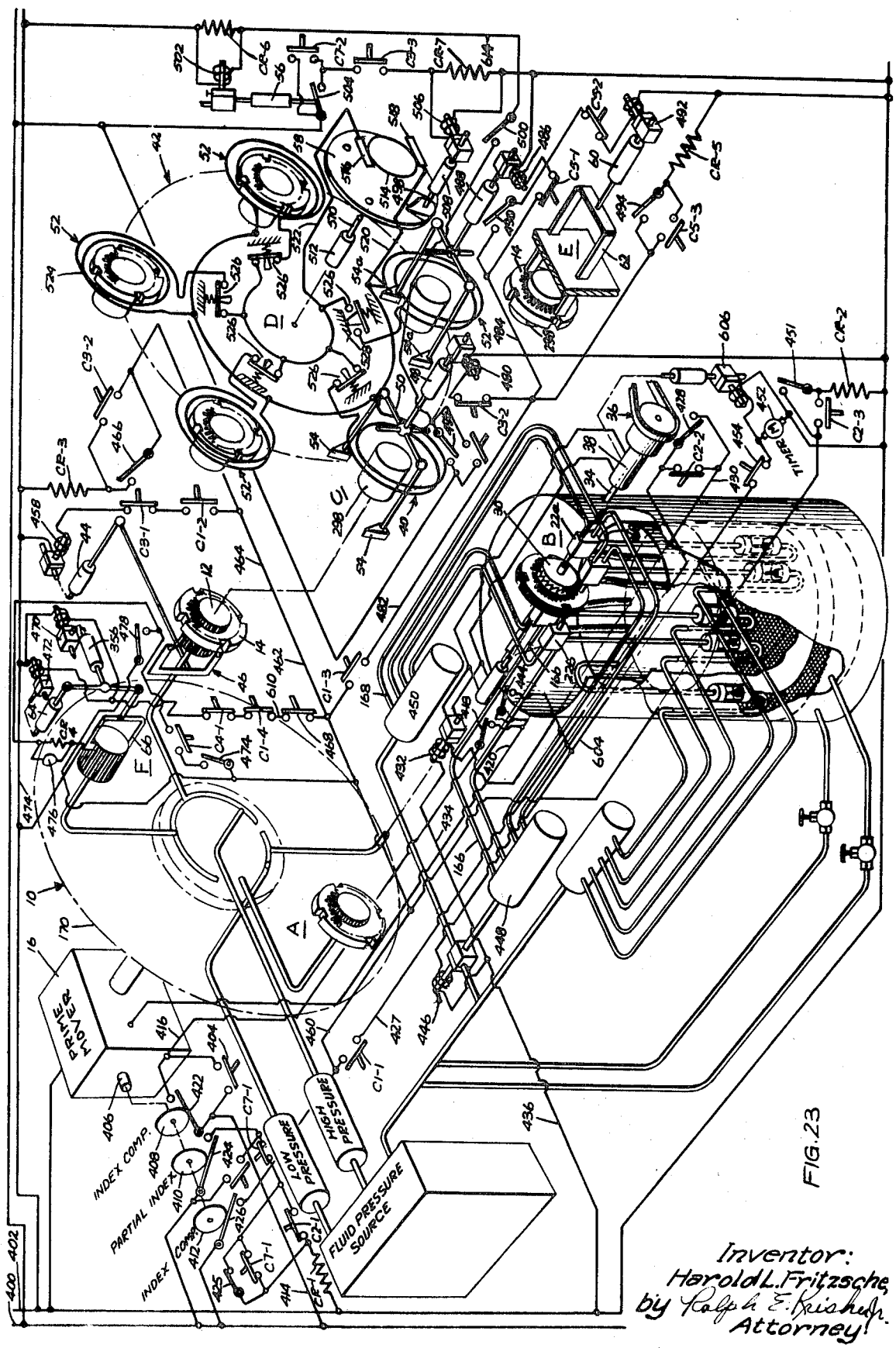
FIG. 23 is a schematic or diagrammatic representation of certain components of the apparatus shown in FIG. 1.

FIG. 23 is a schematic diagram illustrating one form of an electric switching and timing circuit for controlling the operation of the apparatus illustrated in FIG. 1. However, it is assumed that the article support and masking assembly 12 is driven by the motor drive system illustrated in the lower part of FIG. 9 rather than the type illustrated in FIG. 1. The same reference numerals have been used to indicate corresponding parts in FIGS. 1, 9 and 23.

Figure 24:
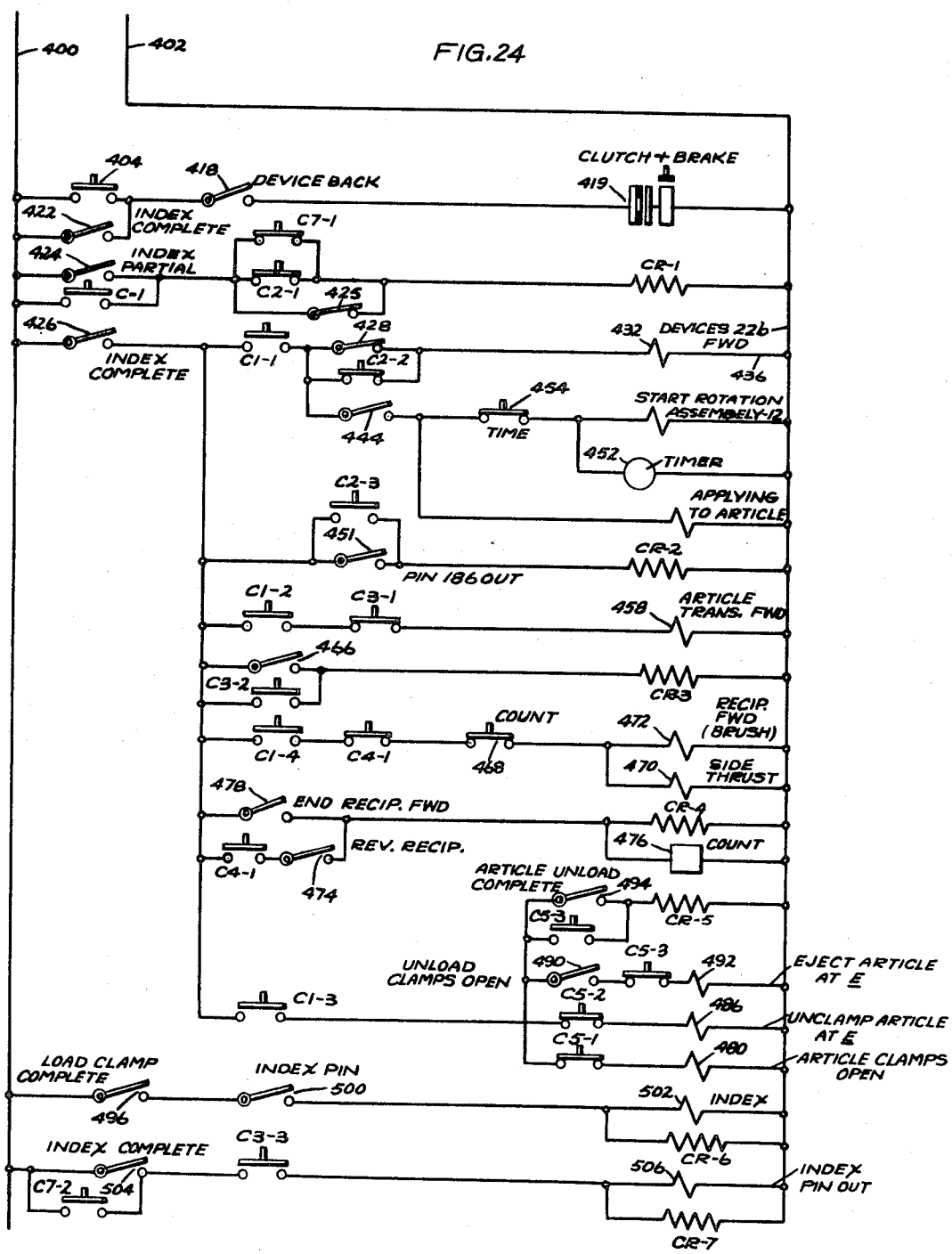
FIG. 24 is a schematic circuit diagram illustrating the operation of the apparatus shown in FIGS. 1 and 23.

FIG. 24 illustrates a schematic circuit diagram of the switching and timing circuit illustrated in FIG. 23. The same reference numerals have been used to indicate corresponding parts in FIGS. 23 and 24.

Electric power is supplied to the switching and timing circuit by means of a pair of bus bars 400 and 402. A pushbutton switch 404 is closed to energize prime mover 16 which rotates a shaft 406 to which are fixed cams 408, 410 and 412. Prime mover 16 is energized from the bus bars via a conductor 414, switch 404, a conductor 416, switch 418 and a conductor 420.

Switch 418 is normally open when the nozzle assemblies 22b are in their forward or spraying condition, but we will assume now that the nozzle assemblies are tilted to their back position so that switch 418 is closed.

Switch 404 is of the momentary contact type which opens when it is released. However, as the primer mover 16 rotates shaft 406, cam 408 closes the normally open switch 422 so that the prime mover remains energized even when switch 404 is released. When the indexing operation is completed, i.e. when the dial plate 170 of rotary indexing assembly 10 has been rotated 90°, cam 408 again opens switch 422 to interrupt the power circuit to the prime mover.

As cam shaft 406 continues to rotate, cam 410 closes switch 424 to energize relay coil CR1 via a closed circuit formed between buses 400 and 402 through the normally closed contacts C2–1 of relay coil CR2, the normally closed contact C7–1 of relay coil CR7, and the closed switch 424. When CR1 is thus energized, all of its contacts are closed.

At this time, cam 412 has also closed switch 426. Consequently, an electrical path is completed through switch 426, relay contacts C1–1, conductor 427, a switch 428, conductor 430, a solenoid valve 432 and conductors 434 and 436. Switch 428 is normally open but at this time is closed by the movement of the cam stop 440 into the slot 442 in the clutch and brake assembly 248 (FIG. 9). Cam stop 440 locks the shaft 238 in such a position that lugs 242 may be received into the corresponding holes in plate 240 when the clutch and brake assembly 248 is in the condition in which the shaft 238 is disengaged from the motor drive 244.

Energization of solenoid valve 432 admits air to the air cylinder assembly 433 to cause the nozzles 22b to be driven to their forward or spraying position. Energization of solenoid 432 also admits air to the air cylinder assembly 252 to drive the serrated member 30 fixed to shaft 34 into driving engagement with the serrated surface 32 on the end of the article support and masking assembly 12. When the nozzle assemblies 22 are in this forward position, switch 418 is opened and switch 444 is closed to complete a circuit through a solenoid valve 446 which admits air into the spray air accumulator 448 which supplies spray air via the conduits 166 to the channels 152 in the nozzle assemblies 22a and 22b. Solenoid valve 446 is controlled through a timer motor 452 and its normally closed contacts 454. The timer motor determines the length of time during which the nozzle assemblies 22a and 22b apply coating material to the article in Station B. For example, when an indexing cycle is approximately 6 seconds, after 5 seconds timing motor 452 opens its contacts 454 to cause cam 440 to retract thereby opening switch 428 to interrupt the circuit through the solenoid valve 446, thereby cutting off the flow of air to the spray air accumulator 448 and admitting air to the control air accumulator 450 which supplies air through conduits 168 to the control channels 154 and 155 in the nozzle assemblies 22a and 22b. When switch 428 opens, the circuit through solenoid valve 432 is deenergized, and the air cylinder 26 is operated to move the nozzle assemblies 22b back to their non-spraying position, and the air cylinder 252 is operated to disengage the serrated member 30 from the serrated surface 32 of the article support and masking assembly 12. When the control air from accumulator 450 is applied to the nozzle assemblies 22a and 22b, the stream of coating material is deflected away from the nozzles 160 and returned to the supply tank 28 as illustrated in FIGS. 2 and 5.

Simultaneously, with the application of coating material to the core 14 in Station B, another core is being transferred in Station C from the article support and masking assembly 12 to the Magnetizing-Article Compressing Station D. At Station C, power is applied to a solenoid valve 458 via the closed switch 426, conductors 460, 462 and 464, normally open contacts C1–2 of relay CR1, and the normally closed contacts C3–1 of another relay CR3. When solenoid valve 458 is so energized, air cylinder assembly 44 is operated to cause the article-transferring assembly 46 to push the core 14 from the article support and masking assembly 12 onto the tapered plug 298 of the magnetizing-article compressing assembly 40. When the transferring assembly is in its forwardmost position, it mechanically closes a switch 466 to energize relay coil CR3, thereby opening the contacts C3–1 but closing the normally open contacts C3–2, thereby maintaining CR3 energized even after switch 466 is opened. Consequently, solenoid valve 458 is deenergized, and air cylinder 64 is operated to withdraw the article-transferring assembly 46 to its initial position.

Of course, simultaneously with the material-applying and article-transferring operations, a cleaning operation is taking place in the Article Support-Cleaning Station F. Current flows from the conductor 462 via the closed contact C1–4, the closed switch 468, and the closed contact C4–1 of relay CR4 to a solenoid valve 470 and also to a solenoid valve 472. These valves control the flow of air to air cylinders 356 and 364, which respectively controls the oscillator and reciprocator of the mask cleaning assembly 66 (see FIGS. 20 and 21). Contacts 468 are the normally closed contacts of a counter to be described below, and contacts C4–1 are the contacts of relay CR4 also to be described below. When the cleaning assembly 66 reaches the right extremity of its motion as viewed in FIG. 20 and FIG. 23, it closes the normally open switch 478 to complete a circuit through relay CR4 and a predetermined counter 476. When CR4 is deenergized, its contacts C4–1 open to break the circuit to the solenoid valves 472 and 470, thereby causing their associated air cylinders 64 and 356 to reverse direction, thereby causing the reciprocating and oscillating motion of the cleaning assembly 66.

Energization of relay CR4 also closes its normally open contacts C4–2 thereby assuring that CR4 remains energized while the cleaning assembly 66 is returning to its limit position to the left as viewed in FIGS. 20 and 23. When this limit position is reached, a limit switch 474 is opened, thereby interrupting the circuit through relay CR4 and once again closing contacts C4–1 so that the cleaning assembly 66 is again moved to the left, thereby repeating the reciprocation of the cleaning assembly 66. The predetermined counter 476 counts the number of times relay CR4 is energized, and at the end of a predetermined number of counts, opens its contacts 468 to interrupt the circuit to the air cylinder solenoid valves 472 and 470 thereby terminating the cleaning cycle. Counter 476 may be preset to determine the number of reciprocations made by cleaning assembly 66 for each cleaning operation of an article support and masking assembly in Station F.

Let us now return to the Magnetizing-Article Compressing Station D to which a core 14 has been transferred from the Article-Transferring Station C. When the indexing of dial plate 170 of rotary indexing assembly 10 is complete, current is applied via line 460 through normally open contacts C1–3 of relay coil CR3, line 482 and the closed contacts C5–1 of the relay CR5 to a solenoid valve 480. Energization of the valve causes air cylinder assembly 48 to move spider 50 to the left thereby moving the C clamps 54 to the left and causing them to rotate away from the tapered plug 298 of the magnetizing-article compressing assembly 40 as previously described, thereby permitting the core 14 to be transferred to the plug 298. Concurrently, current flows from line 482 via line 484, and the normally closed contacts C5–2 of relay CR5 to another solenoid valve 486 which causes an air cylinder 488 to operate the corresponding spider in the Article-Unloading Station E to unclamp the core 14 in Station E. When the clamps 54 are in their unlocked or open position, they close a switch 490 to complete a circuit through the normally closed contacts C5–3 of relay CR5 and through another solenoid valve 492 which then operates air cylinder assembly 60 to drive the unloading assembly 62 to the left as viewed in FIGS. 1 and 23 thereby removing the core 14 from the tapered plug of the assembly 40 in Station E. When the unloading assembly 62 has moved to its left limit position, it closes a limit switch 494 to energize relay CR5. The energization of relay CR5 causes its contacts C5–4 to close and its contacts C5–1, C5–2, and C5–3 to open thereby causing the clamps 54 to return to the right to their clamping positions by the action of springs 322 (see FIG. 13) and also returning the unloading assembly 62 to its initial withdrawn position.

When clamping of the core by the clamps 54 is complete at the Article-Transferring Station C, a limit switch 496 is closed, and when the index pin 498 of the ratchet mechanism 58 is disengaged from the mechanism, a switch 500 is also closed, thereby completing a circuit through relay CR6. Simultaneously, a solenoid valve 502 is energized to operate air cylinder assembly 56 which initiates indexing of the dial plate 314 of the indexing assembly 42 as best seen in FIG. 24. When an indexing step is completed, a limit switch 504 is closed thereby forming a circuit through the closed contact C3–3 of relay CR3, relay CR7 and a solenoid valve 506. Energization of this solenoid valve operates an air cylinder assembly 508 which withdraws the position pin 498 from the ratchet mechanism 58. While the position pin 498 is being withdrawn, an indexing pin 510 is inserted into the ratchet mechanism 58 by means of a suitably actuated air cylinder assembly 512. The withdrawal of the position pin 498 opens the switch 500 to deenergize relay CR6, thereby causing the indexing air cylinder 56 to reverse its direction of movement. The position pin 498 inserted in the dial plate 314 prevents the dial plate 314 from moving on this return motion of the air cylinder assembly 56. The contacts C3–3 are normally open but are closed by the energization of relay CR3 when the switch 466 is closed by the presence of article-transferring assembly 46 in its right limit position upon the transfer of a core 14 from the Article-Transferring Station C to the assembly 40 in the Magnetizing-Article Compressing Station D, thereby preventing indexing of the indexing assembly 42 in the event that a core is not transferred to the magnetizing-article compressing assembly 40. The opening of switch 500 also interrupts the circuit to solenoid valve 502, thereby causing the ratchet mechanism 58 to return to its initial position.

As illustrated in FIGS. 1 and 23, direct current is applied to slip rings 514 collected by a pair of brushes 516 and 518 and fed to the five doughnut-shaped magnetizing-article compressing assemblies 40. The current is applied via conductors 520 and 522 to a doughnut-shaped coil 524 of the five electromagnet assemblies 52. The current is applied in parallel to the coils 524. Each coil is connected to the conductor 522 through a switch 526. Each of these switches is closed at the Article-Transferring Station C and remains closed through the next three indexing positions of the rotary indexing assembly 42. However, at the fifth indexing position, i.e., Article-Unloading Station E, each switch 526 engages a cam surface 528 to open the switch and interrupt the current path to the coil 524, thereby deenergizing the electromagnet assembly 52. Deenergization of the electromagnet releases the magnetic forces tending to keep the coil 14 positioned centrally within the assembly 52 thereby permitting the unloading mechanism 62 more easily to remove the core from the plug 298 at the Article-Unloading Station E.

The operation of the apparatus will now be summarized with primary reference only to the switching and timing circuit illustrated in FIG. 24.

Switch 404 is closed to actuate the machine, and switch 418 is closed at this time. Then an electromagnetic clutch and brake assembly 419 is energized to cause the dial plate 170 of rotary indexing assembly 10 to index. Thus clutch and brake assembly is not illustrated in FIG. 1 but may be considered a part of the prime mover 16.

After partial index of the dial plate, switch 404 is sealed through switch 422. Switch 424 is closed momentarily thereby energizing relay CR1 and setting up additional circuits via the various contacts C1 of relay Cr1. Switch 425 is normally closed to insure energization of relay CR1 during the material-applying operation.

When an index is complete, switch 422 is opened, thereby deenergizing the clutch and brake assembly 419 to prevent further indexing of the dial plate. In one design total indexing time is in the order of one–one and one-half seconds. Furthermore, switch 426 is closed and the nozzle assemblies 22b move forward into material-applying position in Station D. The closed contacts C2–2 provide the necessary circuit through solenoid valve 432.

When the nozzles are in their forward, material-applying position, switch 444 is closed and the following operations occur: (a) cam 440 (FIG. 9) and pin 186 (FIG. 7) are withdrawn to permit the article support and masking assembly 12 to be rotated; (b) the material-applying operation starts; (c) switch 428 is now closed so that the nozzles stay in their forward positions; and (d) clamping air cylinder assembly 38 is actuated to compress the article, such as core 14, on the article support and masking assembly 12. When cam 440 has been completely withdrawn, a switch 451 is closed to energize relay coil CR2, thereby opening its normally closed contacts C2–2 and C2–1. Switch 428 now completes the circuit to valve 432.

After a predetermined time, the contacts 454 of timer 452 open, thereby causing the cam 440 to move forward and contact the outer periphery of collar 248. When the cam 440 engages the slot 442 in the collar 248, switch 428 is opened, thereby causing the nozzles 22b to retract to their initial position and terminating the material-applying operation. When the nozzles are retracted, switch 425 is opened, thereby deenergizing relay CR1 and resetting the circuit for the next cycle. In most situations known to me, the total material application time required should not exceed ten seconds. Thus, the total machine cycle time will be less than 12 seconds even where the material includes magnetic particles.

Let us now look at the Article-Transferring Station C. When the relay CR1 is energized, its contacts C1–2 are closed, thereby causing the transfer cylinder assembly 44 to move transfer assembly 46 forward, thereby transferring the core 14 to the plug 298 of the magnetizing-article compressing assembly 40 which is aligned with the article support and masking assembly 12 in the Article-Transferring Station C.

At the end of the forward stroke of the transfer cylinder 44, switch 466 is closed, thereby energizing relay coil CR3 and opening its contacts C3–1, thereby causing the transfer cylinder 44 to retract to its initial position. Contacts C3–2 seal switch 466 to insure the retracted state of transfer cylinder 44.

Furthermore, the energization of relay coil CR1 causes its contacts C1–4 to close, thereby causing the reciprocating cylinder assembly 64 of the cleaning assembly in Station F to move forward. The side thrust cylinder assembly 356 is similarly actuated. At the end of the forward stroke of the reciprocating cylinder 64, switch 478 is closed, thereby energizing relay coil CR4 whose contacts C4–1 are then opened to cause the reciprocating cylinder 64 to retract. A counter 476 also counts one count. At the end of this reverse stroke, switch 474 is opened, thereby causing relay CR4 to be deenergized so that the reciprocating cylinder 64 is again moved forward. This reciprocating action continues until counter 476 reaches a predetermined count at which time the counter contacts 468 are opened, thereby causing the cylinder 64 to move to its retracted position and stop.

The energization of relay coil CR1 also closes its contacts C1–3, thereby causing the unclamping cylinder 48 to be actuated and open the C-shaped clamps 54. When these clamps open, switch 490 is closed, thereby causing the stator core 14 to be ejected from the magnetizing-article compression assembly 40.

When this core-unloading action is complete, switch 494 is closed, thereby causing relay coil CR5 to be energized, which in turn causes the unload or eject air cylinder 76 to retract and unclamp cylinder 488 to retract. When contacts C1–3 are later opened by the energization of relay coil CR7, relay coil CR5 is deenergized and the cylinders 60 and 480 are retracted.

After a sprayed core has been transferred into the magnetizing-article compressing assembly and the clamping of a core in the magnetizing-article compressing assembly 40 is complete, switch 496 is closed. The index drive pin switch 500 is also closed, thereby causing indexing of the rotary indexing assembly 42.

When the index is complete, switch 504 is closed, thereby causing the index drive pin 498 to be retracted, the position pin 510 to be inserted, and the relay coils CR7 to be energized. Retraction the index pin causes switch 500 to open, thereby causing the indexing cylinder assembly 56 to retract and relay coil CR6 to be deenergized. When the closed contacts C7–1 are opened by the energization of relay coil CR7, relay coil CR1 is deenergized, and the circuit is deenergized to complete a machine cycle. It will be appreciated that the individual machine operations at the various stations are accomplished simultaneously. For the reasons explained in U.S. Pat. No. 3,355,310, it is quite desirable to remove the stator from assembly 12 within twelve seconds of the application of material to the selected surfaces of the article, and this is readily achieved in the present cycle. Also, as the material is being applied in Station B, the article is being transferred in Station C to an axially aligned magnetizing-article compressing assembly 40 which is then indexed to the next position in Station D, providing an unoccupied assembly 40 in axial alignment in Station C. The number of assemblies 40 provided in Station D will, of course, be one factor in controlling the total time that the articles are subjected to the magnetic field at that station. If desired, of course, assemblies 40 may be deenergized before reaching Unloading Station E to shorten the period of time the articles will be under the influence of a magnetic field.

FIG. 25 is a schematic illustration of a variation of the Magnetizing-Article Compressing Station D illustrated in FIGS. 1 and 23. In the station illustrated in FIG. 25, only two magnetizing-article compressing assemblies 40 are required. Such a station is useful where the coating material applied in Material-Applying Station B sets up or hardens to the desired degree very quickly so that the three additional index positions shown in FIGS. 1 and 23 are not required in order to provide time for the material to harden sufficiently.

Again, DC current is collected by brushes 516 and 518 and applied by conductors 520 and 522 to each of the coils 524 of the electromagnet assemblies 52. However, in this exemplification of the invention, the coils are connected in series with the conductors. Switches 540 are normally open so that the coils are normally energized. However, when an electromagnet assembly 52 is indexed through the Unloading Station E, its switch 540 engages the cam surface 542, thereby closing the switch and shunting the coil 524 so that the coil is deenergized. Consequently, magnetic forces tending to keep the core in position centrally within the electromagnet assembly 52 are terminated, and the core can easily be removed from the plug 298 by means of the core ejecting assembly 62.

From the foregoing, it will be appreciated that the present invention has utility to articles other than the stator core of the exemplifications. It can, of course, be quite effectively employed in the manufacture of laminated rotor and transformer cores among other inductive devices. Obviously the various components, e.g., assemblies 12 and 40, should be modified to the configuration of the device and to the selected surfaces thereof being coated.

It should be apparent to those skilled in the art that while preferred embodiments of the invention have been described and illustrated in accordance with the patent statutes, changes may be made in the disclosed embodiments without actually departing from the true spirit and scope of this invention as defined in the following claims which are intended to cover all such equivalent variations as fall within the invention.

What I claim as new and desire to secure by Letters Patent of the United States is:

1. A method of automatically forming adherent protective coatings from heat-hardenable material intermixed with magnetic particles on selected surfaces of a plurality of pre-heated laminated articles of manufacture comprising the steps of: applying the material intermixed with magnetic particles in a layer to selected surfaces of each article as the article is being supported by a support assembly in a material-applying station; moving the article carried on the support assembly from the material-applying station to an article-transferring station; transferring the article with the selected surfaces having the layer thereon from the associated support assembly in the transferring station to a magnetizing assembly; causing the layer while in a liquid condition having magnetic particles therein to become of increased thickness at certain regions of the article by creating a magnetic field in the vicinity of the certain regions; and magnetically compressing the laminated article while causing the layer to be drawn to certain regions of the article to form the increased thickness of the protective coating on those regions and while maintaining the article in the magnetizing assembly.

2. A method of automatically forming adherent protective coatings from heat-hardenable material on selected surfaces of pre-heated laminated articles of manufacture comprising the steps of: applying the material in a layer to selected surfaces of each article as the article is being supported by a support assembly in a material-applying station; moving the article carried on the support assembly from the material-applying station to an article-transferring station; transferring the article with the selected surfaces having the layer thereon from the associated support assembly in the transferring station to another assembly; and compressing the laminated article.

3. The method defined in claim 2 wherein the step of compessing comprises magnetically compressing the laminated article.

4. The method defined in claim 3 further comprising increasing the thickness of certain regions of the insulating layer while in a liquid condition as the article is being magnetically compressed.

5. A method of automatically forming adherent protective coatings from heat-hardenable material on selected surfaces of pre-heated laminated articles of manufacture comprising the steps of: applying the material in a layer to selected surfaces of each article as the article is being supported by a first support assembly in a material-applying station; moving the article carried on the first support assembly from the material-applying station to an article-transferring station; transferring the article with the selected surfaces having the layer thereon from the associated first support assembly in the transferring station to a second assembly by engaging first and second spaced apart portions of the article with first and second article-transferring members while the article is supported by the first support assembly, moving the first and second article-transferring members in a first direction toward the second assembly while in engagement with the first and second spaced apart portions of the article and moving the article relative to the first support assembly in a direction toward the second assembly, and moving the first and second article-transferring members in a second direction away from the first and second spaced apart portions of the article while supporting the article with the second assembly; and compressing the laminated article.

6. The method of claim 5 including subjecting the article to magnetic forces while moving the article relative to the first support assembly, and utilizing magnetic forces to at least assist in moving the article away from the first support assembly.

7. A method for automatically forming an adherent protective coating from heat-hardenable material on selected surfaces of a laminated article of manufacture comprising: applying material onto selected surfaces of the article to form a fusible layer on such surfaces as the article is being carried on a support assembly; transferring the article from the support assembly into a compressive force applying assembly; and applying compressive force to the laminated article as the fusible layer begins to harden while the article is being retained in the compressive force applying assembly.

8. The method of claim 7 in which the fusible layer includes magnetic particles and, as compressive force is being applied to the laminated article, drawing the fusible layer with magnetic forces to certain regions of the article to increase the thickness of the layer at those regions before the fusible layer becomes hardened.

9. The method of claim 7 including drawing the fusible layer to certain regions of the article to increase the thickness of the layer at those regions before the fusible layer becomes hardened.

10. The method of claim 7 wherein applying compressive force to the laminated article includes moving at least one clamp into compressive engagement with the laminated article and mechanically applying compressive force to the article with the at least one clamp.

11. The method of claim 7 wherein applying compressive force to the laminated article includes applying magnetic compressive force to the laminated article.

12. The method of claim 7 wherein applying compressive force to the laminated article includes moving at least one clamp into compressive engagement with the laminated article to apply mechanical compressive force to the article, and applying magnetic compressive force to the article.

References Cited

UNITED STATES PATENTS

| | | | |
|---|---|---|---|
| 3,136,650 | 6/1964 | Avila | 117—235 X |
| 2,443,582 | 6/1948 | Lendo et al. | 269—296 |

(Other references on following page)

UNITED STATES PATENTS

| | | | |
|---|---|---|---|
| 1,025,318 | 5/1912 | Sharp | 269—8 |
| 3,215,966 | 11/1965 | Lord et al. | 29—609 X |
| 2,713,379 | 7/1955 | Sisson | 154—1 |
| 3,355,309 | 11/1967 | Bender et al. | 117—18 |
| 3,355,310 | 11/1967 | De Jean et al. | 117—18 |
| 3,261,707 | 7/1966 | Korski et al. | 117—18 |
| 3,122,667 | 2/1964 | Baciu | 310—259 X |
| 3,190,768 | 6/1965 | Wright | 117—93.2 |
| 3,468,435 | 9/1969 | Ellwanger et al. | 198—22 X |
| 3,523,602 | 8/1970 | Mojden et al. | 198—41 |
| 3,300,019 | 1/1967 | Brigham et al. | 198—22 |
| 3,616,056 | 10/1971 | Sims | 117—18 X |

WILLIAM D. MARTIN, Primary Examiner

BERNARD D. PIANALTO, Assistant Examiner

U.S. Cl. X.R.

198—22 B, 41